(12) United States Patent
Park et al.

(10) Patent No.: US 8,080,611 B2
(45) Date of Patent: Dec. 20, 2011

(54) CHEMICAL AND IMPACT RESISTANT THERMOPLASTIC RESIN COMPOSITION HAVING IMPROVED EXTRUDABILITY

(75) Inventors: Jee Kwon Park, Anyang-si (KR); Jun Myung Kim, Seoul (KR); Jin Hwan Choi, Anyang-si (KR); Jae Won Lee, Osan-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/797,645

(22) Filed: Jun. 10, 2010

(65) Prior Publication Data

US 2010/0249314 A1 Sep. 30, 2010

Related U.S. Application Data

(63) Continuation-in-part of application No. PCT/KR2008/006528, filed on Nov. 6, 2008.

(30) Foreign Application Priority Data

Dec. 28, 2007 (KR) ........................ 10-2007-0139975

(51) Int. Cl.
*C08L 33/14* (2006.01)
*C08L 51/04* (2006.01)
*C08L 67/03* (2006.01)

(52) U.S. Cl. ............................................ 525/65; 525/64

(58) Field of Classification Search .................... None
See application file for complete search history.

(56) References Cited

U.S. PATENT DOCUMENTS

| 4,027,073 A | 5/1977 | Clark |
| 4,994,515 A | 2/1991 | Washiyama et al. |

(Continued)

FOREIGN PATENT DOCUMENTS

EP 0489912 A1 6/1992

(Continued)

OTHER PUBLICATIONS

BASF, Joncryl ADR-4370-S, Mar. 13, 2007, pp. 1-9.*

(Continued)

*Primary Examiner* — Robert Sellers
(74) *Attorney, Agent, or Firm* — Summa, Additon & Ashe, P.A.

(57) ABSTRACT

The present invention provides a chemical and impact resistant thermoplastic resin composition that can have improved extrudability. In one embodiment, the thermoplastic resin composition comprises a base resin including (A) about 1 to about 98% by weight of an epoxy group-containing vinyl copolymer resin; (B) about 1 to about 98% by weight of a rubber modified styrene copolymer resin; and (C) about 1 to about 98% by weight of a polyester resin; and about 1 to about 6 parts by weight of an aromatic vinyl-vinyl cyanide copolymer resin having a weight average molecular weight of about 1,000,000 to about 5,000,000, per 100 parts by weight of the base resin comprising (A)+(B)+(C). In another embodiment, the thermoplastic resin composition comprises a base resin including (A) about 1 to about 98% by weight of an epoxy group-containing vinyl copolymer resin; (B) about 1 to about 98% by weight of a rubber modified styrene copolymer resin; and (C) about 1 to about 98% by weight of a polyester resin; and (E) about 0.01 to about 1 part by weight of an epoxy-based additive, per 100 parts by weight of the base resin comprising (A)+(B)+(C).

20 Claims, 1 Drawing Sheet

U.S. PATENT DOCUMENTS

| | | | |
|---|---|---|---|
| 5,039,729 A | 8/1991 | Brackenridge et al. | |
| 5,055,235 A | 10/1991 | Brackenridge et al. | |
| 5,290,855 A | 3/1994 | Kodama et al. | |
| 5,635,565 A | 6/1997 | Miyajma et al. | |
| 5,712,336 A | 1/1998 | Gareiss et al. | |
| 5,989,723 A * | 11/1999 | Tsai et al. | 428/483 |
| 6,117,371 A | 9/2000 | Mack | |
| 6,447,913 B1 | 9/2002 | Watanabe et al. | |
| 7,288,587 B2 | 10/2007 | Saitou et al. | |
| 2001/0041772 A1 | 11/2001 | Masubuchi et al. | |
| 2005/0137311 A1 | 6/2005 | Muylem et al. | |
| 2008/0088961 A1 | 4/2008 | Kushida | |
| 2008/0160240 A1 | 7/2008 | Son et al. | |
| 2008/0221255 A1* | 9/2008 | Ahn et al. | 524/502 |
| 2010/0029828 A1 | 2/2010 | Ahn et al. | |
| 2010/0041800 A1 | 2/2010 | Son et al. | |
| 2010/0113648 A1 | 5/2010 | Niessner et al. | |
| 2010/0152342 A1 | 6/2010 | Kong et al. | |
| 2010/0152372 A1 | 6/2010 | Oh et al. | |
| 2010/0168292 A1 | 7/2010 | Son et al. | |
| 2010/0168315 A1* | 7/2010 | Park et al. | 524/504 |
| 2010/0249314 A1 | 9/2010 | Park et al. | |

FOREIGN PATENT DOCUMENTS

| | | | |
|---|---|---|---|
| EP | 0502333 A1 | | 9/1992 |
| JP | 01-163243 A | | 6/1989 |
| JP | 1-263149 A | * | 10/1989 |
| JP | 01-304153 A | | 12/1989 |
| JP | 05-295196 A | | 11/1993 |
| JP | 05-339479 A | | 12/1993 |
| JP | 06-322200 A | | 11/1994 |
| JP | 08-311300 A | | 11/1996 |
| JP | 10-175893 | | 6/1998 |
| JP | 2001-139742 A | * | 5/2001 |
| JP | 2002-97374 A | | 4/2002 |
| JP | 2005-272640 | | 10/2005 |
| JP | 18-111787 A | | 4/2006 |
| JP | 2006-143955 A | * | 6/2006 |
| JP | 2007-314619 | | 12/2007 |
| KR | 10-1994-0000552 | | 1/1994 |
| KR | 10-1994-0026146 A | | 12/1994 |
| KR | 159256 B1 | | 1/1999 |
| KR | 10-2004-0022374 A | | 3/2004 |
| KR | 2004-0079118 A | | 9/2004 |
| WO | 90/15103 A1 | | 12/1990 |
| WO | 92/00351 A1 | | 1/1992 |
| WO | 2008/082138 A1 | | 7/2008 |
| WO | 2009/084808 A1 | | 7/2009 |

OTHER PUBLICATIONS

Villalobos et al., "Oligomeric chain extenders for economic reprocessing and recycling of condensation plastics," ScienceDirect, Energy 31, 2006, pp. 3227-3234.*

Machine Translation of JP 2005-272640A, downloaded from http://www19.ipdl.inpit.go.jp/PA1/cgi-bin/PA1DETAIL, Jun. 23, 2009, pp. 1-13.

Suzuhiro Chemica Co., Ltd. Product Info 3-1 (Antimony Trioxide [Fire Cut AT38 AT-3CN AT-3LT AT3CN-LP]) Available Online at: http://www.chemical-suzuhiro.co.jp/EN/pdf/e_product-into[AT3]2.0.pdf, pp. 1-3.

Korean Office Action in commonly owned Korean Application No. 2008-128424 dated May 27, 2011, pp. 1-4.

* cited by examiner

CHEMICAL AND IMPACT RESISTANT THERMOPLASTIC RESIN COMPOSITION HAVING IMPROVED EXTRUDABILITY

CROSS-REFERENCE TO RELATED APPLICATIONS

This application is a continuation-in-part of International Application No. PCT/KR2008/006528, filed Nov. 6, 2008, pending, which designates the U.S., published as WO 2009/084808, and is incorporated herein by reference in its entirety, and claims priority therefrom under 35 USC Section 120. This application also claims priority under 35 USC Section 119 from Korean Patent Application No. 10-2007-0139975, filed Dec. 28, 2007, in the Korean Intellectual Property Office, the entire disclosure of which is also incorporated herein by reference.

FIELD OF THE INVENTION

The present invention relates to a chemical and impact resistant thermoplastic resin composition that can have improved extrudability.

BACKGROUND OF THE INVENTION

Acrylonitrile-butadiene-styrene copolymer resin (hereinafter referred to as 'ABS resin') is a resin in which a copolymer of styrenic monomer and acrylonitrile monomer grafted to butadiene rubbery polymer (hereinafter referred to as 'g-ABS') is dispersed in a matrix of styrene-acrylonitrile copolymer resin (hereinafter referred to as 'SAN'). ABS resin has a good balance of properties such as processability, impact strength, rigidity, and melt strength, in addition to excellent colorability and gloss. Thus ABS resin has been widely used for automobile goods, household electric/electronic appliances and office automation equipment which require a good appearance. However, when ABS resins are used for internal or external parts of electric/electronic goods such as blenders, washing machines, fans, and the like on which repeated stress caused by driving a motor is exerted, it is necessary for these parts to resist such stress and to remain durable for extended use. Thus they are required to have good impact resistance in addition to chemical resistance to strong chemicals such as acetic acid or diesel oil.

Polyester resins typically have a structure including short chains, and thus may not bend easily. Accordingly, polyester resins can have good rigidity, electrical properties, weather resistance and heat resistance, and the tensile strength of polyester resins may not be affected even after long term exposure to high temperatures. Further, crystalline polyester resins have good resistance to various chemicals such as diesel oil.

However, properties of crystalline polyester resins such as processability and impact resistance can degrade when they are exposed to acid or alkali at high temperatures over a period of time. Thus, reinforcing agents such as glass fiber can be added to the polyester resins when polyester resins are employed as a structural material. If reinforcing agents are not added, it is difficult to use polyester resins as injection molded structural materials. In addition, polyester resins can have low melt strength, and thus it can be difficult to form extrusion molded polyester products other than films, such as thick sheets or pipes.

Recent attempts to prepare thermoplastic resins having good chemical resistance and impact resistance have included alloying a polyester resin with an ABS resin. However, the alloy has a disadvantage in that it is difficult to impart good extrudability to the alloy due to its low melt strength.

SUMMARY OF THE INVENTION

The present inventors have developed a thermoplastic resin composition that can have improved melt strength and extrudability as well as excellent chemical resistance and impact resistance. The thermoplastic resin composition includes a base resin including an epoxy group-containing vinyl copolymer resin, a rubber modified aromatic vinyl copolymer resin, and a polyester resin. The thermoplastic resin composition further includes an ultra-high molecular weight aromatic vinyl-vinyl cyanide copolymer resin and/or an epoxy additive.

In an exemplary embodiment, the thermoplastic resin composition comprises a base resin including (A) about 1 to about 98% by weight of an epoxy group-containing vinyl copolymer resin; (B) about 1 to about 98% by weight of a rubber modified aromatic vinyl copolymer resin; and (C) about 1 to about 98% by weight of a polyester resin; and (D) about 1 to about 6 parts by weight of an aromatic vinyl-vinyl cyanide copolymer resin having a weight average molecular weight of about 1,000,000 to about 5,000,000, per 100 parts by weight of the base resin comprising (A)+(B)+(C).

In another exemplary embodiment, the thermoplastic resin composition may comprise a base resin including (A) about 1 to about 98% by weight of an epoxy group-containing vinyl copolymer resin; (B) about 1 to about 98% by weight of a rubber modified aromatic vinyl copolymer resin; and (C) about 1 to about 98% by weight of a polyester resin; and (E) about 0.01 to about 1 part by weight of an epoxy-based additive, per 100 parts by weight of the base resin comprising (A)+(B)+(C).

In exemplary embodiments, the epoxy group-containing vinyl copolymer resin (A) may be a copolymer of (A1) about 0.01 to about 5.0 mol % of an epoxy compound and (A2) about 95 to about 99.99 mol % of a vinyl compound.

The rubber modified aromatic vinyl copolymer resin (B) may comprise (B1) about 10 to about 100% by weight of a graft copolymer resin, and (B2) about 0 to about 90% by weight of a copolymer resin. In exemplary embodiments, the graft copolymer resin (B1) may be a graft copolymer including about 5 to about 65% by weight of a rubbery polymer, about 34 to about 94% by weight of an aromatic vinyl monomer and about 1 to about 30% by weight of a monomer copolymerizable with the aromatic vinyl monomer. Further, the copolymer resin (B2) may be a copolymer including about 60 to about 95% by weight of an aromatic vinyl monomer and about 5 to about 40% by weight of a monomer copolymerizable with the aromatic vinyl monomer.

In exemplary embodiments, the aromatic vinyl-vinyl cyanide copolymer resin (D) may have a non-linear structure. The aromatic vinyl-vinyl cyanide copolymer resin (D) may be a copolymer of an aromatic vinyl monomer, a vinyl cyanide monomer and a multifunctional compound. The multifunctional compound may be selected from multifunctional mercaptans, multifunctional acrylic monomers and mixtures thereof. In exemplary embodiments, the aromatic vinyl-vinyl cyanide copolymer resin (D) may be a copolymer prepared by polymerizing 100 parts by weight of a monomer mixture comprising about 50 to about 90% by weight of an aromatic vinyl monomer and about 10 to about 50% by weight of a vinyl cyanide monomer, with about 0.01 to about 5 parts by weight of multifunctional mercaptan and about 0.005 to about 5 parts by weight of multifunctional acrylic monomer.

Examples of the multifunctional mercaptan may include without limitation trimethylolpropane tris(3-mercaptopropionate), trimethylolpropane tris(3-mercaptoacetate), trimethylolpropane tris(4-mercaptobutanoate), trimethylolpropane tris(5-mercaptopentanoate), trimethylolpropane tris(6-mercaptohexanoate), pentaerythritol tetrakis(2-mercaptoacetate), pentaerythritol tetrakis(3-mercaptopropionate), pentaerythritol tetrakis(4-mercaptobutanoate), pentaerythritol tetrakis(5-mercaptopentanoate), pentaerythritol tetrakis(6-mercaptohexanoate), and mixtures thereof.

Examples of the multifunctional acrylic monomer may include without limitation ethylene dimethacrylate, diethylene glycol methacrylate, trimethylolpropane trimethacrylate, 1,3-butanediol dimethacrylate, 1,6-hexanediol dimethacrylate, allyl acrylate and mixtures thereof.

In exemplary embodiments, the resin composition may further comprise (E) an epoxy-based additive. Examples of the epoxy-based additive (E) may include without limitation epoxy group substituted acrylates, epoxy group substituted methacrylates, epoxy group substituted diol compounds, epoxy group substituted amine compounds and mixtures thereof, polymers thereof, copolymers thereof, and polymer mixtures. The epoxy-based additive (E) may be used in an amount of about 0.01 to 1 part by weight per 100 parts by weight of the base resin comprising (A)+(B)+(C).

The resin composition of the present invention may further comprise one or more additives selected from anti-dripping agents, flame retardants, antimicrobials, releasing agents, heat stabilizers, antioxidants, light stabilizers, compatibilizers, pigments, inorganic fillers, surfactants, nucleating agents, coupling agents, fillers, plasticizers, impact modifiers, colorants, stabilizers, lubricants, antistatic agents, dyes, flameproof agents, and the like. These additives may be used alone or in combination with one another.

Another aspect of the present invention provides a molded article molded from the resin composition. In an exemplary embodiment, the molded article can have an Izod impact strength of about 55 kgf·cm/cm or more measured in accordance with ASTM D-256 using ⅛" thick specimens and a melt strength of about 20 Mn or more measured using a Goettfert Rheotens under the conditions of 20/1 die, an extrusion speed of 0.5 mm/s, and an extrusion temperature of 250° C. In other exemplary embodiments, the molded article can have an Izod impact strength of about 40 kgf·cm/cm or more measured in accordance with ASTM D-256 using ⅛" thick specimens and a melt strength of about 20 Mn or more measured using a Goettfert Rheotens under the conditions of 20/1 die, an extrusion speed of 0.5 mm/s, and an extrusion temperature of 250° C.

DETAILED DESCRIPTION OF THE INVENTION

Figure 1:
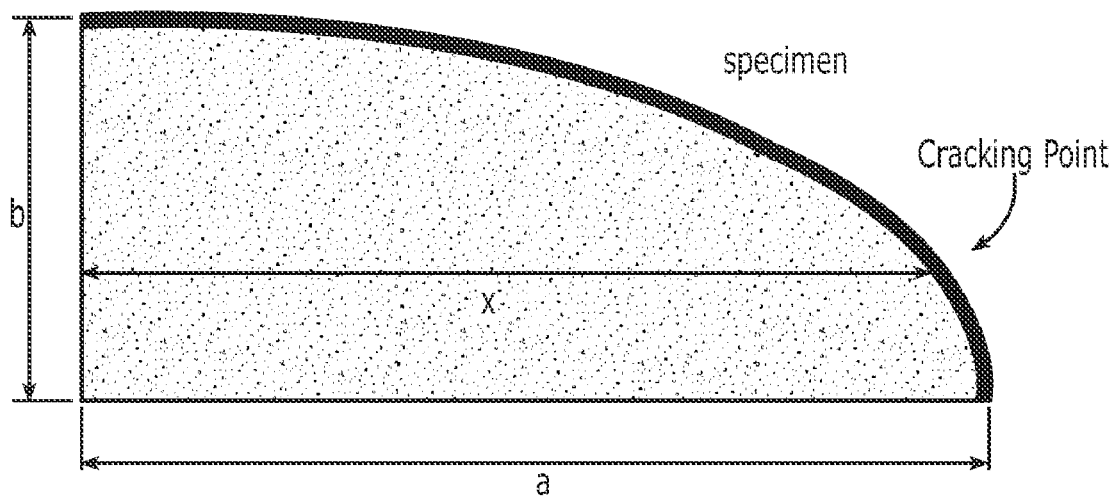
FIG. 1 is a graph illustrating the test described in the examples for determining chemical resistance of a specimen to an organic solvent, in which "a" is the length (in mm) of a long axis of a measuring instrument, "b" is the length (in mm) of a short axis of a measuring instrument, and "x" is the cracking length (in mm) of a specimen from the short axis.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

In an exemplary embodiment, the thermoplastic resin composition of the present invention comprises a base resin including (A) an epoxy group-containing vinyl copolymer resin; (B) a rubber modified aromatic vinyl copolymer resin; and (C) a polyester resin; and with regard to the base resin comprising (A)+(B)+(C), (D) an ultra-high molecular weight aromatic vinyl-vinyl cyanide copolymer resin.

In another exemplary embodiment, the thermoplastic resin composition may comprise (E) an epoxy-based additive instead of the ultra-high molecular weight aromatic vinyl-vinyl cyanide copolymer resin (D).

In other exemplary embodiments, the thermoplastic resin composition may comprise both the ultra-high molecular weight aromatic vinyl-vinyl cyanide copolymer resin (D) and the epoxy-based additive (E).

(A) Epoxy Group-Containing Vinyl Copolymer Resin

The epoxy group-containing vinyl copolymer resin is a resin prepared by polymerizing a monomer mixture comprising an epoxy group-containing unsaturated epoxy compound (A1) and a vinyl compound (A2) so that the unsaturated epoxy group is present in the vinyl copolymer.

The monomer mixture may comprise about 0.01 to about 5.0 mol % of an epoxy group-containing unsaturated epoxy compound (A1) and about 95 to about 99.99 mol % of a vinyl compound (A2). Within these ranges, a good balance of properties such as impact strength, processability and appearance can be obtained.

(A1) Epoxy Group-Containing Unsaturated Epoxy Compound

The unsaturated epoxy compound used in the epoxy group-containing vinyl copolymer can be represented by the following Chemical Formula 1:

[Chemical Formula 1]

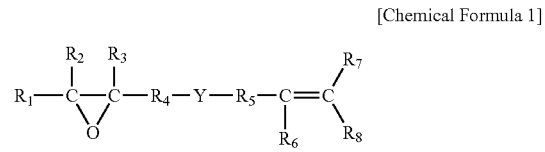

wherein: $R_1$, $R_2$, $R_3$, $R_6$, $R_7$ and $R_8$ are each independently hydrogen, saturated or unsaturated $C_1$-$C_{12}$ alkyl, $C_6$-$C_{14}$ aryl, or saturated or unsaturated $C_1$-$C_{12}$alkyl-substituted $C_6$-$C_{14}$ aryl; and Y is an ether group (—O—), carboxyl group (-0-[C═O]—, —[O═C]—O—), $C_1$-$C_{12}$ alkylene, $C_6$-$C_{14}$ arylene, or saturated or unsaturated $C_1$-$C_{12}$alkyl-substituted $C_6$-$C_{14}$ arylene;

with the proviso that when Y is an ether group (—O—) or carboxyl group (-0-[C═O]—, —[O═C]—O—), $R_4$ and $R_5$ are each independently $C_1$-$C_{12}$ alkylene, $C_6$-$C_{14}$ arylene or saturated or unsaturated $C_1$-$C_{12}$ alkyl-substituted $C_6$-$C_{14}$ arylene; and when Y is $C_1$-$C_{12}$ alkylene, $C_6$-$C_{14}$ arylene or saturated or unsaturated $C_1$-$C_{12}$ alkyl-substituted $C_6$-$C_{14}$ arylene, Y represents a ($R_4$—Y—$R_5$) structure.

Examples of the compound may include without limitation epoxy alkyl acrylates, epoxy alkyl methacrylates, allyl glycidyl ester, aryl glycidyl esters, glycidyl methacrylate, glycidyl acrylate, butadiene monoxide, vinyl glycidyl ether, glycidyl itaconate, and the like. These epoxy-based compounds can be used alone or in combination with one another.

The epoxy group-containing unsaturated epoxy compound (A1) is added as a comonomer in an amount of about 0.01 to about 5 mol %, for example 0.1 to about 5 mol %, and as another example about 1 to about 5 mol %. In some embodiments, the monomer mixture may include the epoxy group-containing unsaturated epoxy compound (A1) in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 mol %. Further, according to some embodiments of the present invention, the amount of the epoxy group-containing unsaturated epoxy compound (A1) can be in a range from about any of the foregoing amounts to about any other of the foregoing amounts. If the amount of the epoxy compound is less than about 0.01 mol %, it may be difficult to improve impact strength. When the amount of the epoxy compound exceeds about 5 mol %, there may be a problem of gelation during an extrusion process.

(A2) Vinyl Compound

The vinyl compound used in the epoxy group-containing vinyl copolymer of the present invention may comprise an aromatic vinyl monomer and a monomer copolymerizable with the aromatic vinyl monomer.

Examples of the aromatic vinyl monomer may include, but are not limited to, styrene, $\alpha$-methyl styrene, $\beta$-methyl styrene, p-methyl styrene, p-t-butylstyrene, ethylstyrene, vinyl xylene, monochlorostyrene, dichlorostyrene, dibromostyrene, vinyl naphthalene, and the like. In exemplary embodiments, the aromatic vinyl monomer includes styrene, $\alpha$-methyl styrene, $\beta$-methyl styrene, p-methyl styrene, p-t-butylstyrene, or ethylstyrene, and in other exemplary embodiments the aromatic vinyl monomer includes styrene. These aromatic vinyl monomers can be used alone or in combination with one another.

The monomer copolymerizable with the aromatic vinyl monomer may be used alone or in combination with one or more other copolymerizable monomers. Examples of the monomer copolymerizable with the aromatic vinyl monomer may include, but are not limited to, unsaturated nitrile monomers such as acrylonitrile, methacrylonitrile, and ethacrylonitrile. In exemplary embodiments, the monomer copolymerizable with the aromatic vinyl monomer is acrylonitrile.

The ratio of the aromatic vinyl monomer to the monomer copolymerizable with the aromatic vinyl monomer can be determined taking into account compatibility and the ratio of monomers of the rubber modified aromatic vinyl copolymer resin (B) excluding rubber. The vinyl compound (A2) may include about 40 to about 90% by weight, for example about 50 to about 80% by weight, of an aromatic vinyl monomer and about 10 to about 60% by weight, for example about 20 to about 50% by weight, of a monomer copolymerizable with the aromatic vinyl monomer.

In some embodiments, the vinyl compound (A2) may include the aromatic vinyl monomer in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the aromatic vinyl monomer can be in a range from about any of the foregoing amounts to about any other of the foregoing amounts.

In some embodiments the vinyl compound (A2) may include the monomer copolymerizable with the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60% by weight. Further, according to some embodiments of the present invention, the amount of the monomer copolymerizable with the aromatic vinyl monomer can be in a range from about any of the foregoing amounts to about any other of the foregoing amounts.

If the amount of the aromatic vinyl monomer is less than about 40% by weight, viscosity may increase significantly, which can adversely affect molding performance. When the amount of the aromatic vinyl monomer is more than about 90% by weight, it may be difficult to improve mechanical strength.

In order to impart processability and heat resistance, the vinyl compound (A2) of the present invention may optionally include unsaturated carboxylic acids such as but not limited to acrylic acid and methacrylic acid; (meth)acrylic acid esters such as but not limited to $C_1$-$C_4$ alkyl methacrylates, such as methyl methacrylate, phenyl acrylate, phenyl methacrylate, benzyl acrylate, benzyl methacrylate, 2-phenyl ethyl acrylate, 2-phenyl ethyl methacrylate, 2-phenoxyethyl acrylate, and 2-phenoxy ethyl methacrylate; N-substituted maleimide; unsaturated dicarboxylic acids such as but not limited to maleic acid, fumaric acid, and itaconic acid and anhydrides thereof; and unsaturated nitrogen containing compounds such as but not limited to dimethylaminoethyl acrylate, diethylaminoethyl acrylate, vinylimidazole, vinylpyrrolidone, vinylcaprolactam, vinylcarbazole, vinylaniline, and (meth)acrylamides such as but not limited to acrylamide and methacrylamide. These monomers may be used alone or in combination with one another. The monomers for imparting processability and heat resistance may be used in an amount of about 0 to about 30% by weight, for example about 1 to about 20% by weight, and as another example about 2 to about 15% by weight, per total weight of the vinyl compound (A2). In some embodiments, these optional monomers may be present, i.e., in an amount greater than about 0% by weight. In some embodiments these optional monomers may be used in an amount of about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30% by weight. In other embodiments of the invention, the optional monomers may not be present (i.e., 0% by weight). Further, according to some embodiments of the present invention, the amount of these optional monomers can be in a range from about any of the foregoing amounts to about any other of the foregoing amounts.

The vinyl compound (A2) is added as a comonomer in an amount of about 95 to about 99.99 mol %. In some embodiments, the monomer mixture may include the vinyl compound (A2) in an amount of about 95, 96, 97, 98, 99, or 99.99 mol %. Further, according to some embodiments of the present invention, the amount of the vinyl compound (A2) can be in a range from about any of the foregoing amounts to about any other of the foregoing amounts.

The epoxy group-containing vinyl copolymer resin (A) is a part of a base resin including components (A), (B), and (C) as described herein, and the base resin may include the epoxy group-containing vinyl copolymer resin (A) in an amount of about 1 to about 98% by weight, based on the total weight of the base resin including (A), (B), and (C). In some embodiments epoxy group-containing vinyl copolymer resin (A) may be used in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98% by weight. Further, according to some embodiments of the present invention, the amount of the epoxy group-containing vinyl copolymer resin (A) may be in a range from about any of the foregoing amounts to about any other of the foregoing amounts. Within these ranges, a good balance of properties such as impact strength, chemical resistance, and extrudability can be obtained.

In an exemplary embodiment, the epoxy group-containing vinyl copolymer resin (A) may be used in an amount of about 10 to about 85% by weight. In another exemplary embodiment, the epoxy group-containing vinyl copolymer resin (A) may be used in an amount of about 15 to about 45% by weight. In other exemplary embodiments, the epoxy group-containing vinyl copolymer resin (A) may be used in an amount of about 50 to about 90% by weight.

(B) Rubber Modified Aromatic Vinyl Styrene Copolymer Resin

The rubber modified aromatic vinyl copolymer resin according to the present invention can be a polymer in which rubbery polymers are dispersed in the form of particles in a matrix (continuous phase) comprising an aromatic vinyl polymer. The rubber modified aromatic vinyl copolymer resin may be prepared by polymerizing an aromatic vinyl monomer and a monomer copolymerizable with the aromatic vinyl monomer added to the rubbery polymers.

The rubber modified aromatic vinyl copolymer resin may be prepared by well-known methods such as emulsion polymerization, suspension polymerization, and bulk polymerization. Conventionally, the rubber modified aromatic vinyl resin is prepared by extruding a graft copolymer resin and a copolymer resin. In bulk polymerization, both a graft copolymer resin and a copolymer resin are prepared together in one process. Regardless of the polymerization method used, the rubber content in a final rubber modified aromatic vinyl copolymer resin can be about 5 to about 60% by weight, for example, about 10 to about 30% by weight. In some embodiments the rubber content in a final rubber modified aromatic vinyl copolymer resin can be about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60% by weight. Further, according to some embodiments of the present invention, the rubber content in a final rubber modified aromatic vinyl copolymer resin may be in a range from about any of the foregoing amounts to about any other of the foregoing amounts.

In the present invention, in order to obtain desirable properties in the alloy of a rubber modified aromatic vinyl copolymer resin and a polyester resin, the Z-average size of rubber particles of the rubber can range from about 0.1 to about 6.0 μm, for example about 0.25 to about 3.5 μm.

In the rubber modified aromatic vinyl copolymer resin of the present invention, the graft copolymer resin can be used alone or in combination with the copolymer resin, depending on the compatibility thereof.

(B1) Graft Copolymer Resin

The graft copolymer resin (B1) of the present invention may be prepared by graft-copolymerizing a rubbery polymer, an aromatic vinyl monomer, a monomer copolymerizable with the aromatic vinyl monomer, and optionally other monomers imparting processability and heat resistance.

Examples of the rubbery polymer may include without limitation diene rubbers such as polybutadiene, poly(styrene-butadiene), poly(acrylonitrile-butadiene), and the like; saturated rubbers in which hydrogen is added to the diene rubbers; isoprene rubbers; acrylic rubbers such as polybutyl acrylic acid; terpolymers of ethylene-propylene-diene (EPDM), and the like, and combinations thereof. In exemplary embodiments, the rubbery polymer includes a diene rubber, for example butadiene rubber.

The rubbery polymer may be used in an amount of about 5 to about 65% by weight, for example about 20 to about 60% by weight, based on about 100% by weight of the graft copolymer resin (B1). In some embodiments the rubbery polymer may be used in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65% by weight. Further, according to some embodiments of the present invention, the rubbery polymer may be used in an amount from about any of the foregoing amounts to about any other of the foregoing amounts.

The average particle size of the rubbers can range from about 0.1 to about 4.0 μm, taking into account the desired impact strength and appearance of the resin composition.

Examples of the aromatic vinyl monomer may include, but are not limited to, styrene, α-methyl styrene, β-methyl styrene, p-methyl styrene, p-t-butylstyrene, ethylstyrene, vinyl xylene, monochlorostyrene, dichlorostyrene, dibromostyrene, vinyl naphthalene and the like. In exemplary embodiments, the aromatic vinyl monomer includes styrene, α-methyl styrene, n-methyl styrene, p-methyl styrene, p-t-butylstyrene, or ethylstyrene, for example styrene. These monomers may be used alone or in combination with one another.

The aromatic vinyl monomer may be used in an amount of about 34 to about 94% by weight, for example about 35 to about 50% by weight, based on the total weight of the graft copolymer resin (B1). In some embodiments the aromatic vinyl monomer may be used in an amount of about 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, or 94% by weight. Further, according to some embodiments of the present invention, the aromatic vinyl monomer may be used in an amount from about any of the foregoing amounts to about any other of the foregoing amounts.

The graft copolymer resin (B1) may include at least one other monomer copolymerizable with the aromatic vinyl monomer. Examples of the monomers which may be copolymerized with the aromatic vinyl monomer may include without limitation unsaturated nitrile-containing compounds such as acrylonitrile, methacrylonitrile and ethacrylonitrile. These monomers may be used alone or in combination with one another. The monomer copolymerizable with the aromatic vinyl monomer may be used in an amount of about 1 to about 30% by weight, for example about 5 to about 25% by weight, based on the total weight of the graft copolymer resin (B1). In some embodiments the monomer copolymerizable with the aromatic vinyl monomer may be used in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30% by weight. Further, according to some embodiments of the present invention, the monomer copolymerizable with the aromatic vinyl monomer may be used in an amount from about any of the foregoing amounts to about any other of the foregoing amounts.

Examples of the monomers imparting processability and heat resistance may include without limitation acrylic acid, methacrylic acid, maleic anhydride, N-substituted maleimide, and the like. These monomers imparting processability and heat resistance may be used alone or in combination with one another. The monomers imparting processability and heat resistance may be used in an amount of about 0 to about 15% by weight, based on the total weight of the graft copolymer resin (B1). In some embodiments, the optional monomer imparting processability and heat resistance may be present, i.e., in an amount greater than about 0% by weight. In some embodiments the monomer imparting processability and heat resistance may be used in an amount of about 0, 1, 2, 3, 4, 5, 6, 7, 8, 9, 10, 11, 12, 13, 14, or 15% by weight. In other embodiments of the invention, the optional monomer imparting processability and heat resistance may not be present (i.e., 0% by weight). Further, according to some embodiments of the present invention, the monomer imparting processability heat resistance may be used in an amount from about any of the foregoing amounts to about any other of the foregoing amounts.

(B2) Copolymer Resin

The copolymer resin of the present invention may be prepared by copolymerizing aromatic vinyl monomer, monomer copolymerizable with the aromatic vinyl monomer, and optionally other monomers imparting processability and heat resistance. The monomer ratio may be adjusted depending on the monomer ratio of the graft copolymer resin (B1) excluding rubber and compatibility.

The weight average molecular weight of the copolymer resin (B2) may be about 60,000 to about 300,000, for example about 80,000 to about 200,000.

Examples of the aromatic vinyl monomer includes styrenic monomers such as but not limited to, styrene, α-methylstyrene, β-methylstyrene, p-methylstyrene, p-t-butyl styrene, ethylstyrene, monochlorostyrene, dichlorostyrene, dibromostyrene, and the like. In exemplary embodiments, the aromatic vinyl monomer includes styrene, α-methylstyrene, β-methylstyrene, p-methylstyrene, p-t-butyl styrene, or ethylstyrene, for example styrene. The aromatic vinyl monomer may be used alone or in combination with one another.

The aromatic vinyl monomer of the present invention may be used in an amount of about 60 to about 95% by weight, for example about 70 to about 90% by weight, based on the total weight of the copolymer resin (B2). In some embodiments the aromatic vinyl monomer may be used in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the aromatic vinyl monomer may be used in an amount from about any of the foregoing amounts to about any other of the foregoing amounts.

Examples of the monomer copolymerizable with the aromatic vinyl monomer may include, but are not limited to, unsaturated nitrile compounds such as acrylonitrile, ethacrylonitrile and methacrylonitrile. These monomers may be used alone or in combination with one another. The monomer copolymerizable with the aromatic vinyl monomers may be used in an amount of about 5 to about 40% by weight, for example 10 to about 35% by weight, based on the total weight of the copolymer resin (B2). In some embodiments the monomer copolymerizable with the aromatic vinyl monomer may be used in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the monomer copolymerizable with the aromatic vinyl monomer may be used in an amount from about any of the foregoing amounts to about any other of the foregoing amounts.

Examples of the monomers imparting processability and heat resistance may include without limitation acrylic acid, methacrylic acid, maleic anhydride, N-substituted maleimide and the like. These monomers imparting processability and heat resistance may be used alone or in combination with one another. The monomers imparting processability and heat resistance may be used in an amount of about 0 to about 30% by weight, based on the total weight of the copolymer resin (B2). In some embodiments, the optional monomer imparting processability and heat resistance may be present, i.e., in an amount greater than about 0% by weight. In some embodiments the monomer imparting processability and heat resistance may be used in an amount of about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30% by weight. In other embodiments of the invention, the optional monomer imparting processability and heat resistance may not be present (i.e., 0% by weight). Further, according to some embodiments of the present invention, the monomer imparting processability and heat resistance may be used in an amount from about any of the foregoing amounts to about any other of the foregoing amounts In exemplary embodiments of the invention, the rubber modified styrene copolymer resin (B) may include acrylonitrile-butadiene-styrene (ABS) copolymer resins, acrylonitrile-ethylenepropylene rubber-styrene (AES) copolymer resins, acrylonitrile-acrylic rubber-styrene (AAS) copolymer resins, and the like, and combinations thereof.

The rubber modified aromatic vinyl copolymer resin (B) of the present invention may comprise about 10 to about 100% by weight of the graft copolymer resin (B1) and about 0 to about 90% by weight of the copolymer resin (B2).

In some embodiments the graft copolymer resin (B1) may be used in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 89, 90, 91, 92, 93, 94, 95, 96, 97, 98, 99 or 100% by weight. Further, according to some embodiments of the present invention, the amount of the graft copolymer resin (B1) may be in a range from about any of the foregoing amounts to about any other of the foregoing amounts.

In some embodiments, the copolymer resin (B2) may be present, i.e., in an amount greater than about 0% by weight. In some embodiments the copolymer resin (B2) may be used in an amount of about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. In other embodiments of the invention, the copolymer resin (B2) may not be present (i.e., 0% by weight). Further, according to some embodiments of the present invention, the amount of the copolymer resin (B2) may be in a range from about any of the foregoing amounts to about any other of the foregoing amounts.

In an exemplary embodiment, the rubber modified aromatic vinyl copolymer resin (B) may comprise about 10 to about 50% by weight of the graft copolymer resin (B1) and about 50 to about 90% by weight of the copolymer resin (B2). In another exemplary embodiment, the rubber modified aromatic vinyl copolymer resin (B) may comprise about 50 to about 95% by weight of the graft copolymer resin (B1) and about 5 to about 50% by weight of the copolymer resin (B2).

In the present invention, the rubber modified aromatic vinyl copolymer resin (B) is a part of a base resin including components (A), (B), and (C) as described herein, and the base resin may include the rubber modified aromatic vinyl copolymer resin (B) in an amount of about 1 to about 98% by weight, based on the total weight of the base resin including components (A), (B), and (C). In some embodiments the rubber modified aromatic vinyl copolymer resin (B) may be used in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98% by weight. Further, according to some embodiments of the present invention, the amount of the rubber modified aromatic vinyl copolymer resin (B) may be in a range from about any of the foregoing amounts to about any other of the foregoing amounts.

Within these ranges, a good balance of properties such as impact strength, chemical resistance, and extrudability can be obtained. In an exemplary embodiment, the rubber modified aromatic vinyl copolymer resin (B) may be used in an amount of about 10 to about 80% by weight. In another exemplary embodiment, the rubber modified aromatic vinyl copolymer resin (B) may be used in an amount of about 15 to about 45% by weight. In other exemplary embodiments, the rubber modified aromatic vinyl copolymer resin (B) may be used in an amount of about 50 to about 90% by weight.

(C) Polyester Resin

The polyester used in the present invention is polyester resin or a copolymer thereof having an intrinsic viscosity of about 0.3 to about 1.15 dL/g, for example about 0.5 to about 1.0 dL/g, and as another example about 0.55 to about 0.9 dL/g.

The polyester resin can be prepared by condensation polymerization reaction of acid or ester such as terephthalic acid (TPA), isophthalic acid (IPA), 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalene dicarboxylic acid, aromatic dicarboxylate in which acid is substituted with a dimethyl group such as dimethyl terephthalate (DMT) and dimethyl isophthalate, alkyl ester of naphthalene dicarboxylate, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, dimethyl-2,7-naphthalate, and the like and mixtures thereof; and diols having 2 to 12 carbon atoms such as ethylene glycol, 1,2-propylene glycol, 1,3-propylene glycol, 2,2-dimethyl-1,3-propanediol, 2,2-dimethyl-1,3-propylene glycol, 1,3-butanediol, 1,4-butanediol, 1,5-pentanediol, 1,6-hexanediol, 1,3-cyclohexane dimethanol, 1,4-cyclohexane dimethanol, and the like and mixtures thereof. The preparation of polyester resin suitable for use in the present invention can be easily carried out by a person of ordinary skill in the art.

Examples of the polyester resin may include without limitation polyalkylene terephthalates such as polyethylene terephthalate (PET), polybutylene terephthalate (PBT) and the like, polyalkylene naphthalates such as polyethylene naphthalate (PEN), polycyclohexaneterephthalate (PCT) and the like, and the like, and mixtures thereof.

In another exemplary embodiment of the invention, the polyester resin (C) may be noncrystalline polyester. The noncrystalline polyester can be a glycol-modified polyalkylene terephthalate, such as poly(ethylene-1,4-cyclohexanedimethylene terephthalate) (PETG).

The polyester resin may be used in the form of a mixture, and recycled polyester resins may also be used.

The polyester resin can be mixed with inorganic particles by conventional methods. Examples of suitable inorganic particles useful in the invention may include without limitation titanium dioxide ($TiO_2$), silicone dioxide ($SiO_2$), aluminum hydroxide ($Al(OH)_3$) and the like and mixtures thereof.

In the present invention, the polyester resin (C) is a part of a base resin including components (A), (B), and (C) as described herein, and the base resin can include the polyester resin (C) in an amount of about 1 to about 98% by weight, based on the total weight of the base resin including components (A), (B), and (C). In some embodiments the polyester resin (C) may be used in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98% by weight. Further, according to some embodiments of the present invention, the amount of the polyester resin (C) may be in a range from about any of the foregoing amounts to about any other of the foregoing amounts.

Within these ranges, a desirable balance of physical properties such as impact strength, chemical resistance, flame retardancy, and extrudability can be obtained. In an exemplary embodiment, the polyester resin (C) may be used in an amount of about 10 to about 80% by weight, based on the total weight of the base resin including components (A), (B), and (C). In another exemplary embodiment, the polyester resin (C) may be used in an amount of about 15 to about 45% by weight, based on the total weight of the base resin including components (A), (B), and (C). In other exemplary embodiments, the polyester resin (C) may be used in an amount of about 50 to about 90% by weight, based on the total weight of the base resin including components (A), (B), and (C).

(D) Ultra-High Molecular Weight Aromatic Vinyl-Vinyl Cyanide Copolymer Resin

The ultra-high molecular weight aromatic vinyl-vinyl cyanide copolymer resin used in the present invention may have a non-linear structure.

In an exemplary embodiment, the ultra-high molecular weight aromatic vinyl-vinyl cyanide copolymer resin (D) may have a weight average molecular weight of about 1,000,000 to about 5,000,000. Within these ranges, it is possible to obtain improved chemical resistance as well as good impact strength. In another exemplary embodiment, the ultra-high molecular weight aromatic vinyl-vinyl cyanide copolymer resin (D) may have a weight average molecular weight of about 1,200,000, 1,500,000, 2,000,000, 2,500,000, 3,000,000, 3,200,000, 3,500,000, 4,000,000, 4,500,000, or 4,800,000.

The ultra-high molecular weight aromatic vinyl-vinyl cyanide copolymer resin (D) may be prepared by polymerizing a monomer mixture comprising an aromatic vinyl monomer and a vinyl cyanide monomer, with one or two or more multifunctional compounds selected from the group consisting of multifunctional mercaptans, multifunctional acrylic monomers, and mixtures thereof. In an exemplary embodiment, the monomer mixture and the multifunctional mercaptan and/or multifunctional acrylic monomer may be mixed and dispersed, and then polymerized at a temperature of about 55 to about 90° C., for example about 60 to about 85° C., for about 1 to about 10 hours, for example about 3 to about 7 hours, in order to prepare a copolymer in bead form.

In an exemplary embodiment, the ultra-high molecular weight aromatic vinyl-vinyl cyanide copolymer resin (D) may be prepared by polymerizing about 0.01 to about 5 parts by weight, for example about 0.05 to about 3 parts by weight, and as another example about 0.1 to about 1 part by weight of multifunctional mercaptan, and 100 parts by weight of a monomer mixture comprising an aromatic vinyl monomer and a vinyl cyanide monomer. In some embodiments the multifunctional mercaptan may be used in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 parts by weight. Further, according to some embodiments of the present invention, the multifunctional mercaptan may be used in an amount from about any of the foregoing amounts to about any other of the foregoing amounts. In another exemplary embodiment, the ultra-high molecular weight aromatic vinyl-vinyl cyanide copolymer resin (D) may be prepared by polymerizing about 0.005 to about 5 parts by weight, for example about 0.01 to about 3 parts by weight, and as another example about 0.07 to about 1 part by weight of a multifunctional acrylic monomer, and 100 parts by weight of a monomer mixture comprising an aromatic vinyl monomer and a vinyl cyanide monomer. In some embodiments the multifunctional acrylic monomer may be used in an amount of about 0.005, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 parts by weight. Further, according to some embodiments of the present invention, the multifunctional acrylic monomer may be used in an amount from about any of the foregoing amounts to about any other of the foregoing amounts.

In other exemplary embodiments, the ultra-high molecular weight aromatic vinyl-vinyl cyanide copolymer resin (D) may be prepared by adding about 0.01 to about 5 parts by weight of multifunctional mercaptan and about 0.005 to about 5 parts by weight of a multifunctional acrylic monomer to 100 parts by weight of a monomer mixture comprising an aromatic vinyl monomer and a vinyl cyanide monomer and then polymerizing them.

In an exemplary embodiment, the monomer mixture may comprise about 50 to about 90% by weight of an aromatic vinyl monomer and about 10 to about 50% by weight of a vinyl cyanide monomer. In another exemplary embodiment, the monomer mixture may comprise about 60 to about 85% by weight of an aromatic vinyl monomer and about 15 to about 40% by weight of a vinyl cyanide monomer. In other exemplary embodiments, the monomer mixture may comprise about 60 to about 80% by weight of an aromatic vinyl monomer and about 20 to about 40% by weight of a vinyl cyanide monomer.

In some embodiments the monomer mixture may include the aromatic vinyl monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 89, or 90% by weight. Further, according to some embodiments of the present invention, the amount of the aromatic vinyl monomer may be in a range from about any of the foregoing amounts to about any other of the foregoing amounts.

In some embodiments the monomer mixture may include the vinyl cyanide monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the cyanide vinyl monomer may be in a range from about any of the foregoing amounts to about any other of the foregoing amounts.

Examples of the aromatic vinyl monomer may include without limitation styrene, p-t-butylstyrene, α-methylstyrene, β-methylstyrene, p-methylstyrene, ethylstyrene, vinyl xylene, monochlorostyrene, dichlorostyrene, dibromostyrene, vinyl naphthalene, and the like. In exemplary embodiments, the aromatic vinyl monomer includes styrene, α-methyl styrene, β-methyl styrene, p-methylstyrene, p-t-butyl styrene, or ethylstyrene, for example styrene. These monomers may be used alone or in combination with one another.

Examples of the vinyl cyanide monomer may include without limitation acrylonitrile, methacrylonitrile, ethacrylonitrile, and the like. In exemplary embodiments, the vinyl cyanide monomer includes acrylonitrile. The monomers may be used alone or in combination with one another.

Exemplary multifunctional mercaptans include without limitation trimethylolpropane tris(3-mercaptopropionate), trimethylolpropane tris(3-mercaptoacetate), trimethylolpropane tris(4-mercaptobutanoate), trimethylolpropane tris(5-mercaptopentanoate), trimethylolpropane tris(6-mercaptohexanoate), pentaerythritol tetrakis(2-mercaptoacetate), pentaerythritol tetrakis(3-mercaptopropionate), pentaerythritol tetrakis(4-mercaptobutanoate), pentaerythritol tetrakis(5-mercaptopentanoate), pentaerythritol tetrakis(6-mercaptohexanoate), and the like, and mixtures thereof.

Exemplary multifunctional acrylic monomers include without limitation ethylene dimethacrylate, diethylene glycol methacrylate, trimethylolpropane trimethacrylate, 1,3-butanediol dimethacrylate, 1,6-hexanediol dimethacrylate, allyl acrylate, and the like. These monomers may also be used alone or in combination with one another.

The ultra-high molecular weight aromatic vinyl-vinyl cyanide copolymer (D) may be used in an amount of about 1 to about 6 parts by weight, for example about 2 to about 5 parts by weight, and as another example about 3 to about 4.5 parts by weight, per 100 parts by weight of the base resin including (A), (B), and (C). In some embodiments the ultra-high molecular weight aromatic vinyl-vinyl cyanide copolymer (D) may be used in an amount of about 1, 2, 3, 4, 5, or 6 part by weight. Further, according to some embodiments of the present invention, the amount of the ultra-high molecular weight aromatic vinyl-vinyl cyanide copolymer (D) may be in a range from about any of the foregoing amounts to about any other of the foregoing amounts.

(E) Epoxy-Based Additive

The epoxy-based additive may include without limitation epoxy group substituted acrylate, epoxy group substituted methacrylate, epoxy group substituted diol compound, epoxy group substituted amine compound, or a mixture thereof, a polymer thereof, a copolymer thereof, or a polymer mixture thereof. Examples of the epoxy-based additive may include without limitation epoxy group substituted (meth)acrylates such as but not limited to epoxy group substituted methyl acrylate, epoxy group substituted ethyl acrylate, epoxy group substituted n-propyl acrylate, epoxy group substituted isopropyl acrylate, epoxy group substituted n-butyl acrylate, epoxy group substituted s-butyl acrylate, epoxy group substituted i-butyl acrylate, epoxy group substituted t-butyl acrylate, epoxy group substituted n-amyl acrylate, epoxy group substituted i-amyl acrylate, epoxy group substituted isobornyl acrylate, epoxy group substituted n-hexyl acrylate, epoxy group substituted 2-ethylbutyl acrylate, epoxy group substituted 2-ethylhexyl acrylate, epoxy group substituted n-octyl acrylate, epoxy group substituted n-decyl acrylate, epoxy group substituted methylcyclohexyl acrylate, epoxy group substituted cyclopentyl acrylate, epoxy group substituted cyclohexyl acrylate, epoxy group substituted methyl methacrylate, epoxy group substituted ethyl methacrylate, epoxy group substituted n-propyl methacrylate, epoxy group substituted n-butyl methacrylate, epoxy group substituted n-amyl methacrylate, epoxy group substituted n-hexyl methacrylate, epoxy group substituted i-amyl methacrylate, epoxy group substituted s-butyl methacrylate, epoxy group substituted t-butyl methacrylate, epoxy group substituted 2-ethylbutyl methacrylate, epoxy group substituted methylcyclohexyl methacrylate, epoxy group substituted cinnamyl methacrylate, epoxy group substituted crotyl methacrylate, epoxy group substituted cyclohexyl methacrylate, epoxy group substituted cyclopentyl methacrylate, epoxy group substituted 2-ethoxyethyl methacrylate, epoxy group substituted isobornyl methacrylate, and the like; epoxy group substituted diol compounds such as epoxy group substituted 2-methyl-1,3-propanediol, epoxy group substituted 3-methyl-2,4-pentanediol, epoxy group substituted 1,10-decanediol, epoxy group substituted 1,6-hexanediol, epoxy group substituted 1,5-pentanediol, and the like; and epoxy group substituted amine compounds such as epoxy group substituted hexamethylene diamine, epoxy group substituted p-phenylene diamine, epoxy group substituted ethylene diamine, epoxy group substituted isophorone diamine, epoxy group substituted 2-methyl-1,5-pentane diamine and the like. They may be used alone or in combination with one another, or used in the form of a homopolymer, a copolymer, or a polymer mixture.

When the epoxy-based additive is used as a polymer, a suitable epoxy equivalent weight may be about 100 g/mol or more, for example about 200 g/mol or more, and as another example about 250 g/mol or more. In addition, a weight average molecular weight thereof may be about 2,000 or more, for example about 4,000 or more, and as another example about 5,000 or more.

In an exemplary embodiment, an epoxy-based additive (E) can be used instead of the ultra-high aromatic vinyl-vinyl cyanide copolymer resin (D), or an epoxy-based additive (E) may be used together with the ultra-high aromatic vinyl-vinyl cyanide copolymer resin (D). The epoxy-based additive (E) may be used in an amount of about 0.01 to 1 part by weight, for example about 0.05 to 0.9 parts by weight, and as another example about 0.1 to about 0.9 parts by weight, per 100 parts by weight of the base resin comprising (A)+(B)+(C). In some embodiments the epoxy-based additive (E) may be used in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, or 1 part by weight, per 100 parts by weight of the base resin comprising (A)+(B)+(C). Further, according to some embodiments of the present invention, the amount of the epoxy-based additive (E) may be in a range from about any of the foregoing amounts to about any other of the foregoing amounts.

The chemical and impact resistant thermoplastic resin composition of the present invention may further comprise one or more additives selected from anti-dripping agents, flame retardants, antimicrobials, releasing agents, heat stabilizers, antioxidants, light stabilizers, compatibilizers, pigments, inorganic fillers, surfactants, nucleating agents, coupling agents, fillers, plasticizers, impact modifiers, colorants, stabilizers, lubricants, antistatic agents, dyes, flameproof agents, and the like. These additives may be used alone or in combination with one another. The inorganic fillers may include glass fiber, silica, talc, ceramic, and the like.

The additive may be used in an amount of 0 to 50 parts by weight, per 100 parts by weight of the base resin comprising (A)+(B)+(C). In some embodiments, the additive may be present, i.e., in an amount greater than about 0% by weight. In some embodiments the additive may be used in an amount of about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight, per 100 parts by weight of the base resin comprising (A)+(B)+(C). In other embodiments of the invention, the additive may not be present (i.e., 0% by weight).

Further, according to some embodiments of the present invention, the amount of the additive may be in a range from about any of the foregoing amounts to about any other of the foregoing amounts.

The resin composition according to the present invention can be prepared by a conventional process. For example, all the components and additives can be mixed together and extruded through an extruder and can be prepared in the form of pellets.

The present invention provides a molded article molded from the resin composition. In an exemplary embodiment, the molded article can have an Izod impact strength of about 55 kgf·cm/cm or more measured in accordance with ASTM D-256 using ⅛" thick specimens and a melt strength of about 20 Mn or more measured using a Goettfert Rheotens under the conditions of 20/1 die, an extrusion speed of 0.5 mm/s, and an extrusion temperature of 250° C. In another exemplary embodiment, the molded article can have an Izod impact strength of about 40 kgf·cm/cm or more measured in accordance with ASTM D-256 using ⅛" thick specimens and a melt strength of about 20 Mn or more measured using a Goettfert Rheotens under the conditions of 20/1 die, an extrusion speed of 0.5 mm/s, and an extrusion temperature of 250° C. In other exemplary embodiments, the molded article can have an Izod impact strength of about 56 to about 75 kgf·cm/cm or more measured in accordance with ASTM D-256 using ⅛" thick specimens and a melt strength of about 25 to about 40 Mn or more measured using a Goettfert Rheotens under the conditions of 20/1 die, an extrusion speed of 0.5 mm/s, and an extrusion temperature of 250° C. In other exemplary embodiments, the molded article can have an Izod impact strength of about 63 to about 80 kgf·cm/cm or more measured in accordance with ASTM D-256 using ⅛" thick specimens and a melt strength of about 23 to about 40 Mn or more measured using a Goettfert Rheotens under the conditions of 20/1 die, extrusion speed of 0.5 mm/s, and extrusion temperature of 250° C.

The resin composition of the present invention can be molded into various products. The resin composition of the invention may be particularly suitable for the housings of electric/electronic appliances, computer housings or office equipment housings, parts of automobiles, construction materials, interior goods, toys, small household and personal items/amenities, and the like.

The invention may be better understood by reference to the following examples which are intended for the purpose of illustration and are not to be construed as in any way limiting the scope of the present invention, which is defined in the claims appended hereto.

EXAMPLES (A) Epoxy Group-Containing Vinyl Copolymer (A1) Epoxy Group-Containing Vinyl Copolymer (GMA 0.7 mol %-SAN)

To a mixture comprising 100 parts by weight of a monomer mixture including 5.0 mol % of glycidyl methacrylate and 70 mol % of styrene and 25 mol % of acrylonitrile, are added 120 parts by weight of deionized water, 0.2 parts by weight of azobisisobutyronitrile, 0.4 parts by weight of tricalcium phosphate, and 0.2 parts by weight of mercaptan-containing chain transfer agent. Then the temperature of the mixture is increased from room temperature to 80° C. for 60 minutes. After maintaining this temperature for 180 minutes, an epoxy group-containing styrene-acrylonitrile copolymer resin (GMA-SAN) is obtained. The resultant product is washed, dehydrated and dried to obtain an epoxy group-containing styrene-acrylonitrile copolymer resin (GMA-SAN) in powder form.

(B) Rubber Modified Styrene Copolymer Resin (B1) Graft Copolymer Resin 50 parts by weight of butadiene rubber latex, 36 parts by weight of styrene, 14 parts by weight of acrylonitrile, and 150 parts by weight of deionized water are mixed. To the mixture, 1.0 part of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate are added. The blend is kept at 75° C. for 5 hours to obtain a graft copolymer (g-ABS) latex. To the g-ABS latex, 0.4 parts of sulfuric acid is added, coagulated and dried to obtain a graft copolymer resin (g-ABS) in powder form.

(B2) Copolymer Resin 75 parts of styrene, 25 parts of acrylonitrile, and 120 parts of deionized water are mixed. To the mixture, 0.2 parts of azobisisobutylonitrile (AIBN), 0.4 parts of tricalciumphosphate and 0.2 parts of mercaptan-containing chain transfer agent are added. The resultant solution is heated to 80° C. for 90 minutes and kept for 180 minutes, and a styrene-acrylonitrile copolymer resin (SAN) is obtained. The resultant product is washed, dehydrated and dried to obtain a styrene-acrylonitrile copolymer resin (SAN) in powder form. The styrene-acrylonitrile copolymer resin has a weight average molecular weight of 120,000.

(C) Polyester Resin (C1) Polyester Resin Having an Intrinsic Viscosity of 0.76 dl/g Manufactured by Anychem Company (Product Name: A1100) is Used.

(C2) Polyester Resin Having an Intrinsic Viscosity of 0.72 dl/g Manufactured by Samyang Company (Product Name: Clear PET Flake) is Used.

(D) Ultra-High Molecular Weight Aromatic Vinyl-Vinyl Cyanide Copolymer Resin 71 parts by weight of styrene, 29 parts by weight of acrylonitrile, 150 parts by weight of ion exchanged water, 0.4 parts by weight of tricalcium phosphate, 0.3 parts by weight of trimethylolpropane tris(3-mercaptopropionate) as a multifunctional mercaptan, 0.15 parts by weight of ethylene dimethacrylate as a multifunctional acrylate monomer, and 0.3 parts by weight of 2,2'-azobisisobutylonitrile as an initiator are charged and mixed in a reactor and then the reactor is sealed completely.

Then, the mixture is stirred vigorously to substantially disperse the components and the polymerization reaction is conducted at 70° C. for 5 hours and then completed as the reactor is cooled to the room temperature. The resultant product is washed, dehydrated and dried to obtain the copolymer in bead form. The copolymer is an acrylonitrile-styrene copolymer resin having 24% by weight of acrylonitrile and a weight average molecular weight of 3,000,000.

(E) Epoxy-Based Additive (E1) Triglycidyl Isocyanurate Manufactured by Aldrich Company is Used.

(E2) JONCRYL ADR-4370S Manufactured by BASF Company is Used.

Examples 1-9 and Comparative Examples 1-6

The components as shown in Table 1 and 0.3 parts by weight of a hydroxy phenyl antioxidant are mixed in a Hansel mixer for 3~10 minutes to prepare a mixture. The mixture is fed into a conventional twin screw extruder with a speed of 30~60 kg/hr and extruded at 180~280° C. at a screw speed of 150~300 rpm as pellets. After the resin pellets are dried at 100° C. for 3 hours, the melt strength is measured. Then, the resin pellets are molded into test specimens using a 6-oz injection molding machine at 180~280° C. with a barrel temperature of 40~80° C. The physical properties and the chemical resistance of the test specimens are measured after leaving the specimens at 23° C. and 50% of relative humidity for 40 hours.

(1) Impact strength: Izod impact strength is measured accordance with ASTM-D256 at a sample thickness of ⅛". The final test result is obtained by calculating an average value from 5 test results (kgf·cm/cm).

(2) Chemical resistance: for measuring chemical resistance to an organic solvent, test specimens with dimensions of L 200 mm*W 50 mm*t 2 mm are equipped with a ¼ oval jig and coated with organic solvent for 24 hours, and then the degree of generated crack is measured by using the following Equation 1 to obtain crack strain, as illustrated in FIG. 1.

$$\epsilon=(b\cdot t)/2a^2*(1-x^2(a^2-b^2)/a^4)^{-3/2}*100(\%) \quad \text{[Equation 1]}$$

wherein:

$\epsilon$: crack strain (%)

a: half length of a long axis in an oval jig (mm)

b: half length of a short axis in an oval jig (mm)

t: thickness of a test specimen (mm)

x: length from a short axis to a crack generated point (mm).

An alkali detergent manufactured by Kao Corporation of Japan (product name: Magic Clean), an acid detergent manufactured by KINCHO of Japan (product name: Sunpole), brake oil manufactured by BOSCH (product name: DOT4) as diesel oil, pure phytoncide as an aromatic evaporator, and salad oil manufactured by Nissin of Japan as an edible oil are used as the organic solvents.

(3) Melt strength: The melt strength is measured using Rheotens manufactured by Goettfert Co., Ltd. under the conditions of 20/l die, an extrusion speed of 0.5 mm/s, and an extrusion temperature of 250° C.

The components used in Examples and Comparative Examples and the results of physical properties are shown in Table 1 and Table 2.

TABLE 1

|  |  | Examples | | | | | | | | |
| --- | --- | --- | --- | --- | --- | --- | --- | --- | --- | --- |
|  |  | 1 | 2 | 3 | 4 | 5 | 6 | 7 | 8 | 9 |
| Epoxy group-containing SAN resin (A) | | 20 | 20 | 20 | 20 | 20 | 20 | 20 | 20 | 20 |
| ABS resin (B) | B1 | 20 | 20 | 20 | 20 | 20 | 20 | 20 | 20 | 20 |
|  | B2 | 20 | 20 | 20 | 20 | 20 | 20 | 20 | 20 | 20 |
| Polyester (C) | C1 | 40 | — | 40 | 40 | 40 | 40 | — | — | 40 |
|  | C2 | — | 40 | — | — | — | — | 40 | 40 | — |
| Ultra-high molecular weight SAN resin (D) | | 4 | 4 | — | — | — | — | — | — | 4 |
| Epoxy-based additive (E) | E1 | — | — | 0.3 | 0.8 | — | — | 0.3 | — | — |
|  | E2 | — | — | — | — | 0.3 | 0.8 | — | 0.3 | 0.3 |
| Impact strength | | 67 | 65 | 63 | 62 | 60 | 57 | 63 | 59 | 67 |
| Chemical resistance | Detergent (alkali) | NC | NC | NC | NC | NC | NC | NC | NC | NC |
|  | Detergent (acid) | NC | NC | NC | NC | NC | NC | NC | NC | NC |
|  | Diesel oil | 2.1 | 2.0 | 1.8 | 1.8 | 1.9 | 1.9 | 1.8 | 1.8 | 2.0 |
|  | Aromatic | NC | NC | 2.2 | 2.2 | 2.3 | 2.3 | 2.1 | 2.1 | 2.3 |
|  | Salad oil | NC | NC | NC | NC | NC | NC | NC | NC | NC |
| Melt strength (mN) | | 30 | 31 | 28 | 32 | 29 | 32 | 28 | 28 | 31 |

*NC: no crack

TABLE 2

|  |  | Comparative Examples | | | | | |
| --- | --- | --- | --- | --- | --- | --- | --- |
|  |  | 1 | 2 | 3 | 4 | 5 | 6 |
| Epoxy group-containing SAN resin (A) | | — | 20 | 20 | — | — | — |
| ABS resin (B) | B1 | 30 | 20 | 20 | 30 | 30 | 30 |
|  | B2 | 70 | 20 | 20 | 30 | 30 | 30 |
| Polyester (C) | C1 | — | 40 | — | 40 | 40 | 40 |
|  | C2 | — | — | 40 | — | — | — |
| Ultra-high molecular weight SAN resin (D) | | — | — | — | 4 | — | — |
| Epoxy-based additive (E) | E1 | — | — | — | — | 0.3 | — |
|  | E2 | — | — | — | — | — | 0.3 |
| Impact strength | | 31 | 62 | 61 | 15 | 12 | 12 |
| Chemical resistance | Detergent (alkali) | 0.9 | NC | NC | 1.5 | 1.4 | 1.4 |
|  | Detergent (acid) | 1.2 | NC | NC | 1.8 | 1.7 | 1.6 |
|  | Diesel oil | 0.4 | 2.1 | 2.2 | 1.2 | 1.1 | 1.1 |
|  | Aromatic | 0.5 | 2.2 | 2.3 | 1.0 | 0.8 | 0.9 |
|  | Salad oil | 1.9 | NC | NC | NC | 2.2 | 2.3 |
| Melt strength (mN) | | 31 | 12 | 10 | 22 | 23 | 23 |

*NC: no crack

As shown in Table 2, Examples exhibiting a good balance of properties such as impact strength, chemical resistance and melt strength can be obtained according to the present invention. Although Comparative Example 1 exhibits good melt strength, it exhibits deteriorated impact strength and chemical resistance. Although Comparative Examples 2-3 exhibit good impact strength and chemical resistance, they exhibit significantly deteriorated melt strength.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A chemical and impact resistant thermoplastic resin composition having improved extrudability comprising:
    a base resin comprising (A) about 1 to about 98% by weight of an epoxy group-containing vinyl copolymer resin; (B) about 1 to about 98% by weight of a rubber modified styrene copolymer resin; and (C) about 1 to about 98% by weight of a polyester resin; and
    (D) about 1 to about 6 parts by weight of an aromatic vinyl-vinyl cyanide copolymer resin having a weight average molecular weight of about 1,000,000 to about 5,000,000, per 100 parts by weight of the base resin comprising (A)+(B)+(C).

2. The thermoplastic resin composition of claim 1, wherein said epoxy group-containing vinyl copolymer resin (A) comprises a copolymer of (A1) about 0.01 to about 5.0 mol % of an epoxy compound and (A2) about 95 to about 99.99 mol % of a vinyl compound (A2).

3. The thermoplastic resin composition of claim 2, wherein said unsaturated epoxy compound (A1) is represented by the following chemical formula 1:

[Chemical Formula 1]

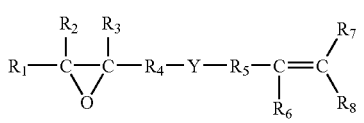

wherein: $R_1$, $R_2$, $R_3$, $R_6$, $R_7$ and $R_8$ are each independently hydrogen, saturated or unsaturated $C_1$-$C_{12}$ alkyl, $C_6$-$C_{14}$ aryl, or saturated or unsaturated $C_1$-$C_{12}$ alkyl-substituted $C_6$-$C_{14}$ aryl; and Y is an ether group (—O—), carboxyl group (-0-[C=O]—, —[O=C]—O—), $C_1$-$C_{12}$ alkylene, $C_6$-$C_{14}$ arylene, or $C_1$-$C_{12}$ saturated or unsaturated alkyl-substituted $C_6$-$C_{14}$ arylene;

with the proviso that when Y is an ether group (—O—) or carboxyl group (-0-[C=O]—, —[O=C]—O—), $R_4$ and $R_5$ are each independently $C_1$-$C_{12}$ alkylene, $C_6$-$C_{14}$ arylene or $C_1$-$C_{12}$ saturated or unsaturated alkyl-substituted $C_6$-$C_{14}$ arylene; and when Y is $C_1$-$C_{12}$ alkylene, $C_6$-$C_{14}$ arylene or $C_1$-$C_{12}$ alkyl-substituted $C_6$-$C_{14}$ arylene, Y represents a ($R_4$—Y—$R_5$) structure.

4. The thermoplastic resin composition of claim 2, wherein said unsaturated epoxy compound (A1) comprises an epoxy alkyl acrylate, epoxy alkyl methacrylate, allyl lycidyl ester, aryl glycidyl ester, glycidyl methacrylate, glycidyl acrylate, butadiene monoxide, vinyl glycidyl ether, glycidyl itaconate, or a combination thereof.

5. The thermoplastic resin composition of claim 2, wherein said vinyl compound (A2) comprises about 40 to about 90% by weight of an aromatic vinyl monomer and about 10 to about 60% by weight of a monomer copolymerizable with the aromatic vinyl monomer.

6. The thermoplastic resin composition of claim 5, wherein said monomer copolymerizable with the aromatic vinyl monomer comprises an unsaturated nitrile monomer.

7. The thermoplastic resin composition of claim 5, wherein said vinyl compound (A2) further comprises about 30% by weight or less of acrylic acid, methacrylic acid, $C_1$-$C_4$ alkyl methacrylate, phenyl acrylate, phenyl methacrylate, benzyl acrylate, benzyl methacrylate, 2-phenyl ethyl acrylate, 2-phenyl ethyl methacrylate, 2-phenoxyethyl acrylate, 2-phenoxy ethyl methacrylate, N-substituted maleimide, maleic acid, fumaric acid, itaconic acid or an anhydride thereof, dimethylaminoethyl acrylate, diethylaminoethyl acrylate, vinylimidazole, vinylpyrrolidone, vinylcaprolactam, vinylcarbazole, vinylaniline, acrylamide, methacrylamide, or a combination thereof.

8. The thermoplastic resin composition of claim 1, wherein said rubber modified styrene copolymer resin (B) comprises (B1) about 10 to about 100% by weight of a graft copolymer resin, and (B2) about 0 to about 90% by weight of a copolymer resin.

9. The thermoplastic resin composition of claim 8, wherein said graft copolymer resin (B1) comprises a graft copolymer comprising about 5 to about 65% by weight of a rubbery polymer, about 34 to about 94% by weight of an aromatic vinyl monomer and about 1 to about 30% by weight of a monomer copolymerizable with the aromatic vinyl monomer, and said copolymer resin (B2) comprises a copolymer comprising about 60 to about 95% by weight of an aromatic vinyl monomer and about 5 to about 40% by weight of a monomer copolymerizable with the aromatic vinyl monomer.

10. The thermoplastic resin composition of claim 1, wherein said aromatic vinyl-vinyl cyanide copolymer resin (D) has a non-linear structure.

11. The thermoplastic resin composition of claim 10, wherein said aromatic vinyl-vinyl cyanide copolymer resin (D) comprises a copolymer of an aromatic vinyl monomer, a vinyl cyanide monomer and a multifunctional compound.

12. The thermoplastic resin composition of claim 11, wherein said multifunctional compound comprises a multifunctional mercaptan, multifunctional acrylic monomer, or a combination thereof.

13. The thermoplastic resin composition of claim 10, wherein said aromatic vinyl-vinyl cyanide copolymer resin (D) comprises a copolymer prepared by polymerizing 100 parts by weight of a monomer mixture comprising about 50 to about 90% by weight of an aromatic vinyl monomer and about 10 to about 50% by weight of a vinyl cyanide monomer, with about 0.01 to about 5 parts by weight of a multifunctional mercaptan and about 0.005 to about 5 parts by weight of a multifunctional acrylic monomer.

14. The thermoplastic resin composition of claim 12, wherein said multifunctional mercaptan comprises trimethylolpropane tris(3-mercaptopropionate), trimethylolpropane tris(3-mercaptoacetate), trimethylolpropane tris(4-mercaptobutanoate), trimethylolpropane tris(5-mercaptopentanoate), trimethylolpropane tris(6-mercaptohexanoate), pentaerythritol tetrakis(2-mercaptoacetate), pentaerythritol tetrakis(3-mercaptopropionate), pentaerythritol tetrakis(4-mercaptobutanoate), pentaerythritol tetrakis(5-mercaptopentanoate), pentaerythritol tetrakis(6-mercaptohexanoate), or a combination thereof.

15. The thermoplastic resin composition of claim 12, wherein said multifunctional acrylic monomer comprises of ethylene dimethacrylate, diethylene glycol methacrylate, trimethylolpropane trimethacrylate, 1,3-butanediol dimethacrylate, 1,6-hexanediol dimethacrylate, ally acrylate or a combination thereof.

16. The thermoplastic resin composition of claim 1, wherein said composition further comprises (E) about 0.01 to 1 part by weight of an epoxy-based additive.

17. The thermoplastic resin composition of claim 16, wherein said epoxy-based additive (E) comprises an epoxy group substituted acrylate, epoxy group substituted methacrylate, epoxy group substituted diol compound, epoxy group substituted amine compound, a mixture thereof, polymer thereof, copolymer thereof, or a polymer mixture thereof.

18. The thermoplastic resin composition of claim 1, wherein said resin composition further comprises an additive selected from the group consisting of anti-dripping agents, flame retardants, antimicrobials, releasing agents, heat stabilizers, antioxidants, light stabilizers, compatibilizers, pigments, inorganic fillers, surfactants, nucleating agents, coupling agents, fillers, plasticizers, impact modifiers, colorants, stabilizers, lubricants, antistatic agents, dyes, flameproof agents, and combinations thereof.

19. A molded article molded from the resin composition as defined in claim 1.

20. The thermoplastic resin composition of claim 19, wherein said molded article has an Izod impact strength of about 55 kgf·cm/cm or more measured in accordance with ASTM D-256 using ⅛" thick specimens and a melt strength of about 20 Mn or more measured using a Goettfert Rheotens under the conditions of 20/1 die, an extrusion speed of 0.5 mm/s, and an extrusion temperature of 250° C.

* * * * *

UNITED STATES PATENT AND TRADEMARK OFFICE
CERTIFICATE OF CORRECTION

PATENT NO.        : 8,080,611 B2
APPLICATION NO.   : 12/797645
DATED             : December 20, 2011
INVENTOR(S)       : Jee Kwon Park et al.

It is certified that error appears in the above-identified patent and that said Letters Patent is hereby corrected as shown below:

Claim 15, Column 22, Line 25 reads "dimethacrylate, 1,6-hexanediol dimethacrylate, ~~ally~~ acrylate"
and should read "dimethacrylate, 1,6-hexanediol dimethacrylate, <u>allyl</u> acrylate"

Signed and Sealed this
Twenty-ninth Day of May, 2012

David J. Kappos
*Director of the United States Patent and Trademark Office*